(12) United States Patent
Park et al.

(10) Patent No.: US 6,688,797 B2
(45) Date of Patent: Feb. 10, 2004

(54) HINGE FOR FOLDABLE LADDERS

(76) Inventors: Jae Yun Park, 129-317 Jongro Gu, Dongsoong Dong, Seoul (KR); Heung Chul Park, 407-802 Woosung Apt, Jungdnmaul, Jungja-Dong, Bundang Ku, Kyungki Do (KR)

( * ) Notice: Subject to any disclaimer, the term of this patent is extended or adjusted under 35 U.S.C. 154(b) by 34 days.

(21) Appl. No.: 10/093,022

(22) Filed: Mar. 7, 2002

(65) Prior Publication Data

US 2003/0012595 A1 Jan. 16, 2003

(30) Foreign Application Priority Data

Jul. 13, 2001 (KR) .................................. 2001-0021284
Jul. 13, 2001 (KR) .................................. 2001-0021285
Jul. 13, 2001 (KR) .................................. 2001-0042320
Jul. 14, 2001 (KR) .................................. 2001-0028399

(51) Int. Cl.[7] ................................ F16C 11/00
(52) U.S. Cl. ........................................ 403/93; 403/84
(58) Field of Search ......................... 403/92, 93, 94, 403/95, 96, 97, 98, 99, 83, 84, 85

(56) References Cited

U.S. PATENT DOCUMENTS

| | | | | |
|---|---|---|---|---|
| 4,407,045 A | * | 10/1983 | Boothe | ............... 403/92 X |
| 4,540,306 A | * | 9/1985 | Wang | ............... 403/93 |
| 4,543,006 A | * | 9/1985 | Wang | ............... 403/93 |
| 4,666,328 A | * | 5/1987 | Ryu | ............... 403/92 |
| 4,770,559 A | * | 9/1988 | Yoo | ............... 403/93 |

* cited by examiner

*Primary Examiner*—John R. Cottingham
(74) *Attorney, Agent, or Firm*—GWiPS

(57) ABSTRACT

A hinge for foldable ladders comprises a first joint member (10) with main discs (13, 14), a second joint member (20) with a sub discs (23), a locking device (30) having a button (32), connecting pin (31), coil spring (34), rectangular locking block (33) and a press locking control device (60) for controlling to latch or unlatch the locking device (30). The first and second joint members (10, 20) are combined together through a common axis of a center shaft (50). The sub disc (23) of the second joint member (20) is inserted between a pair of parallel spaced main discs (13, 14) of the first joint member (10). The main discs (13, 14) have the slot openings (13a, 13c) for inserting the locking device (30). A first and second protruded arcuate stoppers (15, 25) are disposed on the surface of the discs (14, 23) for matching each other. A plurality of detents (28) is formed around periphery of the sub disc (23). At one side of the slot opening (13c) of the main disc (14), a press locking control device (63) is elastically installed for actuating the device.

6 Claims, 13 Drawing Sheets

HINGE FOR FOLDABLE LADDERS

BACKGROUND OF THE INVENTION

1. Field of the Invention

The present invention relates to a hinge for foldable ladders having an improved locking device with a rectangular locking block and a press locking control device with a pressing member. More particularly, the pressing member elastically contacts the rectangular locking block for controlling the operation of ladders. The hinge mechanism innovates by replacing the parts that may cause a malfunction and provides a secondary safety device for the secured operations.

2. Description of the Prior Art

Referring to FIG. 1 and FIG. 2 of the U.S. Pat. No. 4,770,559 (Issue Date: Sep. 13, 1998, Title: Positioning joint for folding ladders), it discloses a conventional hinge comprising a first joint member (10), second joint member (20) being installed inside of disc (23) of the first joint member (10), locking device (30), and guide disc (40). The first joint member (10) comprises two main discs (13, 14) formed with axial hole (12) at a center. The second joint member (20) having a sub-disc member (23) will be inserted between the two main discs (13, 14). The sub disc member (23) forms a rectangular slot (25), coil retaining hole (26), protrusion (27) and a plurality of detents (28) being formed around the periphery. A guide disc (40) is provided with a coil spring (29), retaining hole (46), a plurality of detents (48) formed around the periphery, a rectangular slot (45) and an arcuate slot opening (47). An end of the coil spring (29) is hooked at the coil retaining hole (26) of the sub disc member (23) and the other end is hooked at the coil retaining hole (46) of the guide disc (40).

A locking device (30) comprises a button (32), rectangular locking block (33), and connecting pin (31). The locking device (30) is elastically moved up by the coil spring (29) through the slot openings (35, 36) being formed at the main disc (13, 14) of the first joint member (10).

The first and second joint members (10, 20) are combined by a common axis of a center shaft (50) enabling relative rotation. The coil spring (29) being linked to the second joint member (20) and the guide disc (40) is installed inside of the first joint member (10). According to the interactions between the protrusion (27) and the arcuate slot opening (47), a locking device (30) of the first joint member (10) is selectively latched to the detent (28) located at the periphery of the sub disc (23) of the second joint member (20) under a controlling of the guide disc (40). The locking and unlocking position of the locking device (30) is determined and maintained at preset angular positions by the guide disc (40).

In order to adjust the angular positions of the joint members (10, 20), i.e., for folding or unfolding the ladders, the rectangular locking block (33) must be pulled out from the main disc (14) for disengaging the detent (28) of the second joint member (20) by pushing the button (32) of the locking device (30). Then, the ladder enables to adjust the angular position of the joint members (10, 20) to fold or unfold.

Due to the repeated interactions of the first and second joint members (10, 20), the coil spring (29) being installed between the first and second joint members (10, 20) will contact the inner surface of the main disc (14) accompanied by friction. Thereby, the coil spring will be deformed or broken due to the consistent friction with the interior surface of the main disc (14). If the coil spring (29) is contaminated by a foreign object such as dust, the first and second joint members will not properly operate or get damages. If the ladder is consistently operated with the default, the guide disc (40) will continuously become deformed or twisted by the torsion stress. As a result, the first and second joint members will become completely damaged and will not work.

Also, when the ladder receives an external impact or load, the force will transmit to the hinge parts. The sudden impact or load will damage or deform the hinge of ladders. The conventional ladders having a large clearance have a disadvantage of unstableness and do not properly support the sudden load.

Such a problems as mentioned above could be a potential danger. If an accident occurred due to a malfunction of the hinge, a user would get an injury. Thus, those problems must be solved for improving secured operations of ladders.

SUMMARY OF THE INVENTION

A hinge for foldable ladders of the present invention comprises a first joint member (10) integrally formed with the main discs (13, 14), a second joint member (20) integrally formed with a sub disc (23), a locking device (30) having a button (32), a connecting pin (31), a coil spring (34), and a rectangular locking block (33) and a press locking control device (60) for controlling the latching or unlatching of the locking device (30). The first and second joint members (10, 20) are combined together through a common axis of a center shaft (50) enabling rotation. The sub disc (23) of the second joint member (20) is inserted between a pair of parallel spaced main discs (13, 14) of the first joint member (10). The main discs (13, 14) of the first joint member (10) have slot openings (13a, 13c) for inserting the locking device (30). The first protruded arcuate stopper (15) is disposed at the inner surface of the main disc (14). The second protruded arcuate stopper (25) is formed at the rear surface of the sub disc (23) of the second joint member (20) for matching with the first protruded arcuate stopper (15) of the main disc (14). A plurality of detents (28) is formed around periphery of the sub disc (23). At one side of the slot opening (13c) of the main disc (14), a press locking control device (63) is installed for elastically actuating the device.

As an alternative embodiment of the present invention, a hinge for foldable ladders comprises the first joint member (210) having a couple of common holes (224, 234) at the main discs (213, 214), the second joint member (240) with six piercing holes (244) at the sub disc (223), a center shaft (50) for mounting the first and second joint members, a locking device (260) having a protruding pin (262) integrally formed with the center shaft (50) and installed through the main and sub discs (213, 214, 223), and a pressing member (63) installed lateral of the hole (234) at the main disc (214) of the first joint member (210) for elastically actuating and controlling the back and forth movement of the protruding pin (262) of the locking device (260).

DETAILED DESCRIPTION OF THE INVENTION

Figure 1:
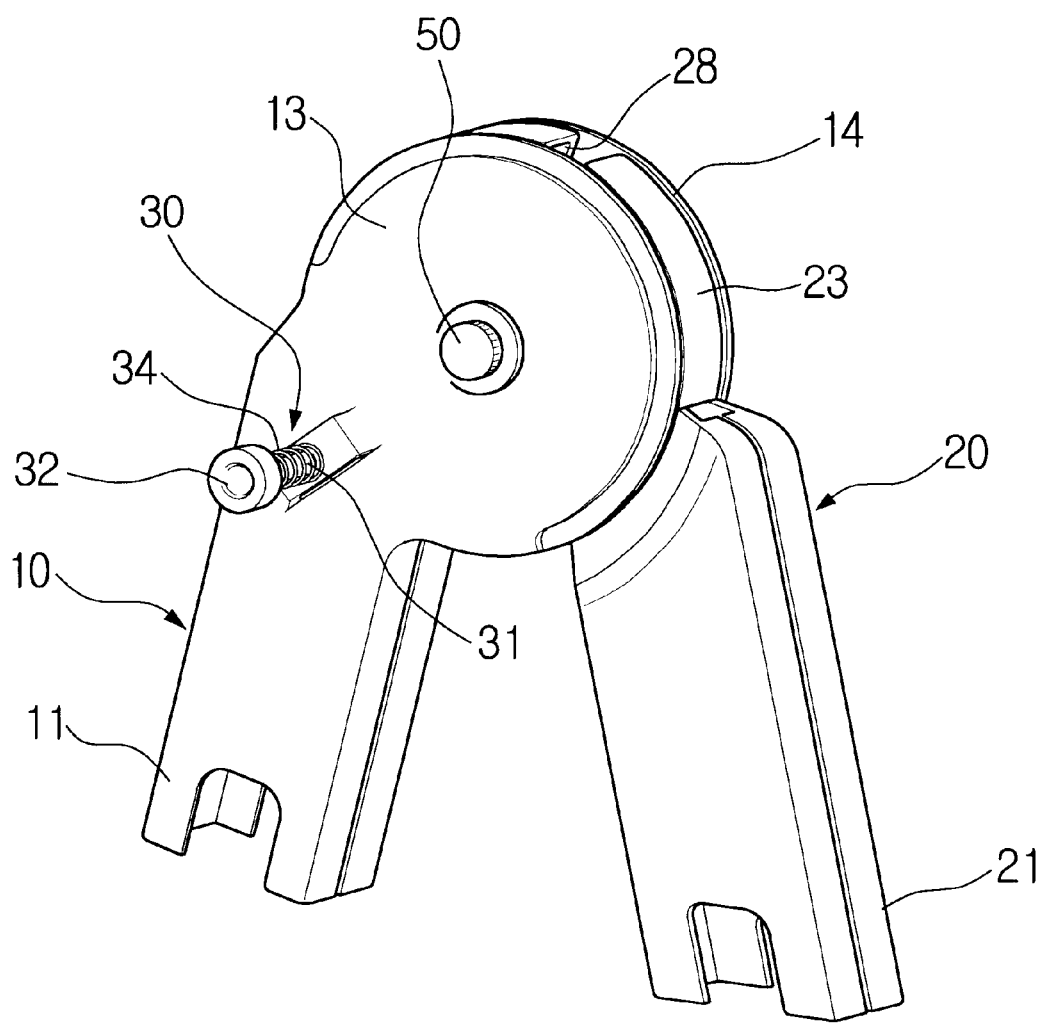
FIG. 1 is a perspective view of the conventional hinge for the folding ladders.
Figure 2:
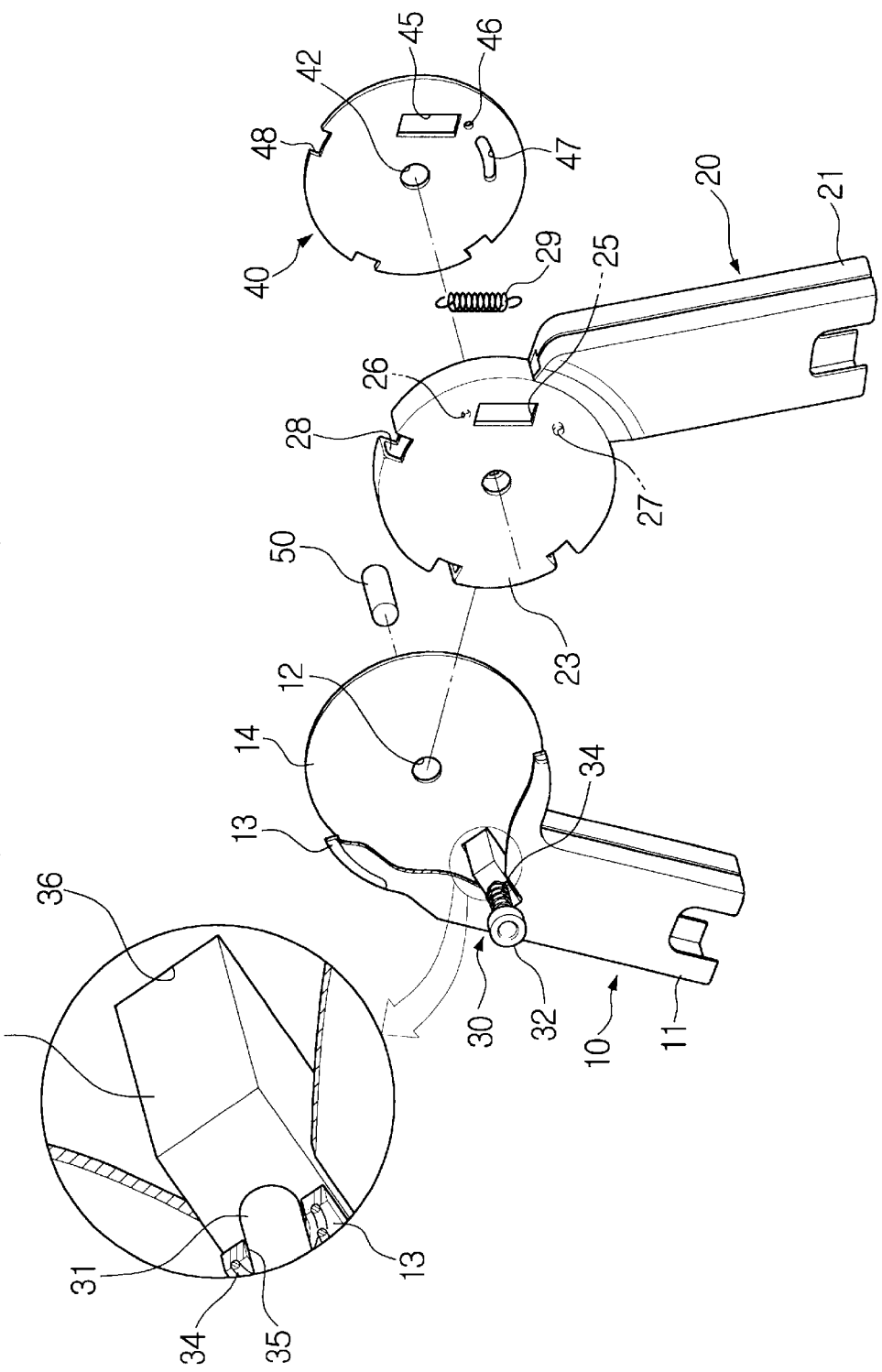
FIG. 2 is an exploded perspective view of the conventional hinge for the folding ladders.

A hinge for foldable ladders of the present invention comprises a first joint member (10) integrally formed with main discs (13, 14), a second joint member (20) integrally formed with a sub disc (23), a locking device (30) having a button (32), a connecting pin (31), a coil spring (34), a rectangular locking block (33) and a press locking control device (60) for controlling to latch or unlatch the locking device (30). The first and second joint members (10, 20) are combined together through a common axis of a center shaft (50) enabling them to rotate. The sub disc (23) of the second joint member (20) is inserted between a pair of parallel spaced main discs (13, 14) of the first joint member (10). The main discs (13, 14) of the first joint member (10) have slot openings (13a, 13c) for inserting the locking device (30). The first protruded arcuate stopper (15) is disposed at the inner surface of the main disc (14). The second protruded arcuate stopper (25) is formed at the rear surface of the sub disc (23) of the second joint member (20) for matching with the first protruded arcuate stopper (15) of main disc (14). A plurality of detents (28) is formed around periphery of the sub disc (23). At one side of slot opening (13c) of the main disc (14), a press locking control device (60) is installed for elastically actuating the device.

As an alternative embodiment of the present invention, a hinge for foldable ladders comprises a first joint member (210) having a couple of common holes (224, 234) at the main discs (213, 214), a second joint member (240) with six piercing holes (244) at the sub disc (223), a center shaft (50) for mounting the first and second joint members, a locking device (260) having a protruding pin (262) integrally formed with the center shaft (50) and installed through the main and sub discs (213, 214, 223), and a pressing member (63) installed lateral of the hole (234) at the main disc (214) of the first joint member (210) for elastically actuating and controlling the back and forth movement of the protruding pin (262) of the locking device (260).

A hinge for foldable ladders of the present invention will discuss in detail accompanying the drawings.

Figure 3:
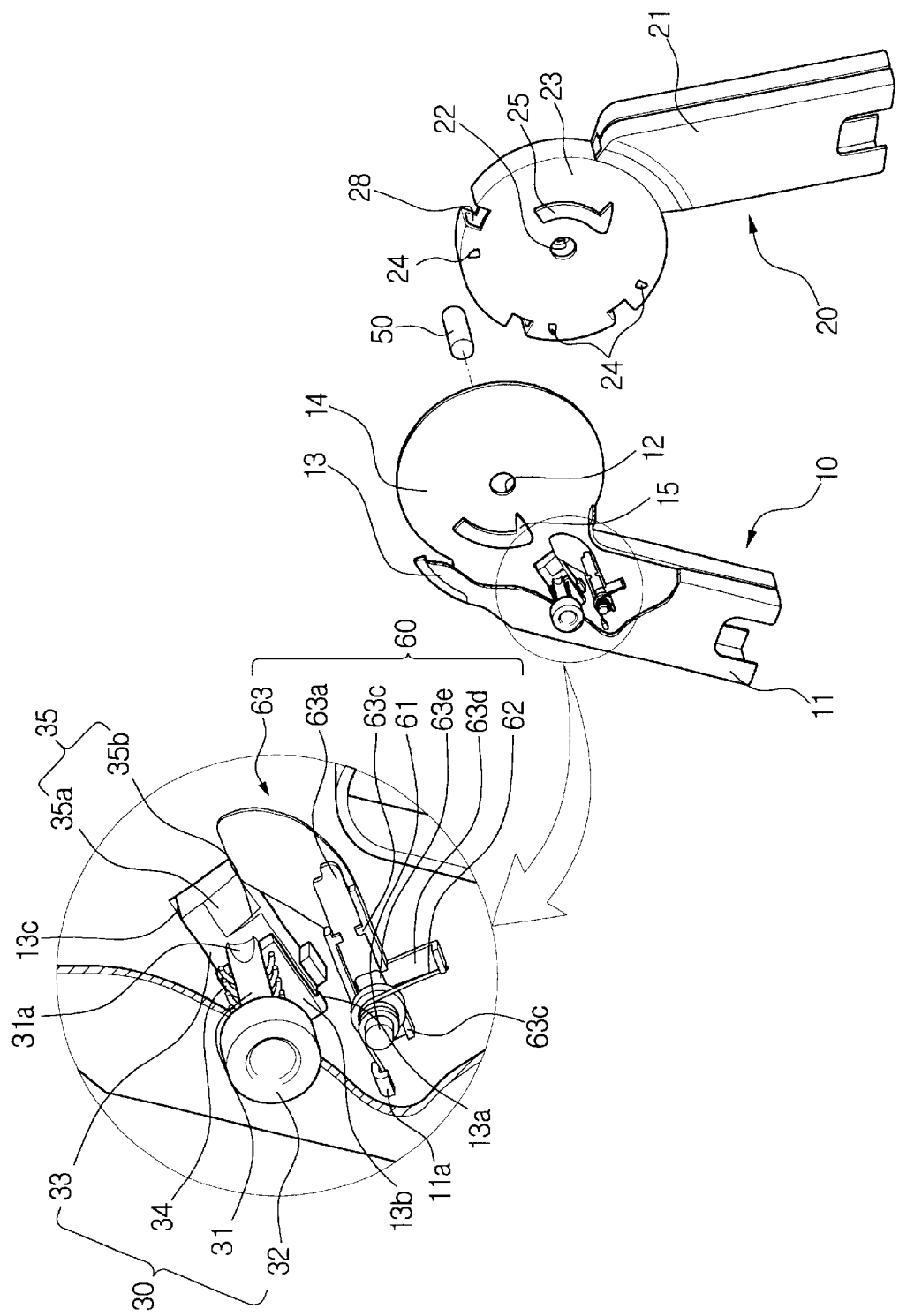
FIG. 3 is an exploded perspective view of the hinge for foldable ladders of the present invention.

As illustrated in FIG. 3, the hinge for foldable ladders comprises a first joint member (10), a second joint member (20), a locking device (30), and a press locking control device (60). In the present invention, a press locking control device (60) of the first joint member (10) is used to control the locking device (30) instead of the guide disc plate (40) as shown in the prior art.

The press locking control device (60) being located below the locking device (30) is elastically actuated on the locking device (30). A rectangular locking block (33) of the locking device (30) enables to move elastically and transversely through the slot openings (13a, 13c) disposed at the main discs (13, 14) of the first joint member (10). At the end of connecting pin (31), a stopper (31a) is partially cut out and abutted to the rectangular locking block (33).

At the top surface of corner end of the rectangular locking block (33), a declined surface (35) is formed in two-dimensional directions. The declined surface (35) comprises a first declined surface being declined from the top to side and a second sloped surface being formed by extending the first declined surface. A pressing member (63) is elastically seated on the sloped surface of the locking block (33).

The press locking control device (60) includes a fixed shaft (61), a pressing member (63) being attached to the fixed shaft (61), a torsion spring (62) exerting a resilient force on the pressing member (63) to push the upper surface of the rectangular locking block (33). The pressing member (63) sits to slide on the sloped surface (35) of the rectangular locking block (33) and makes stop at the stopper (31a) of the connecting pin (31).

Figure 4:
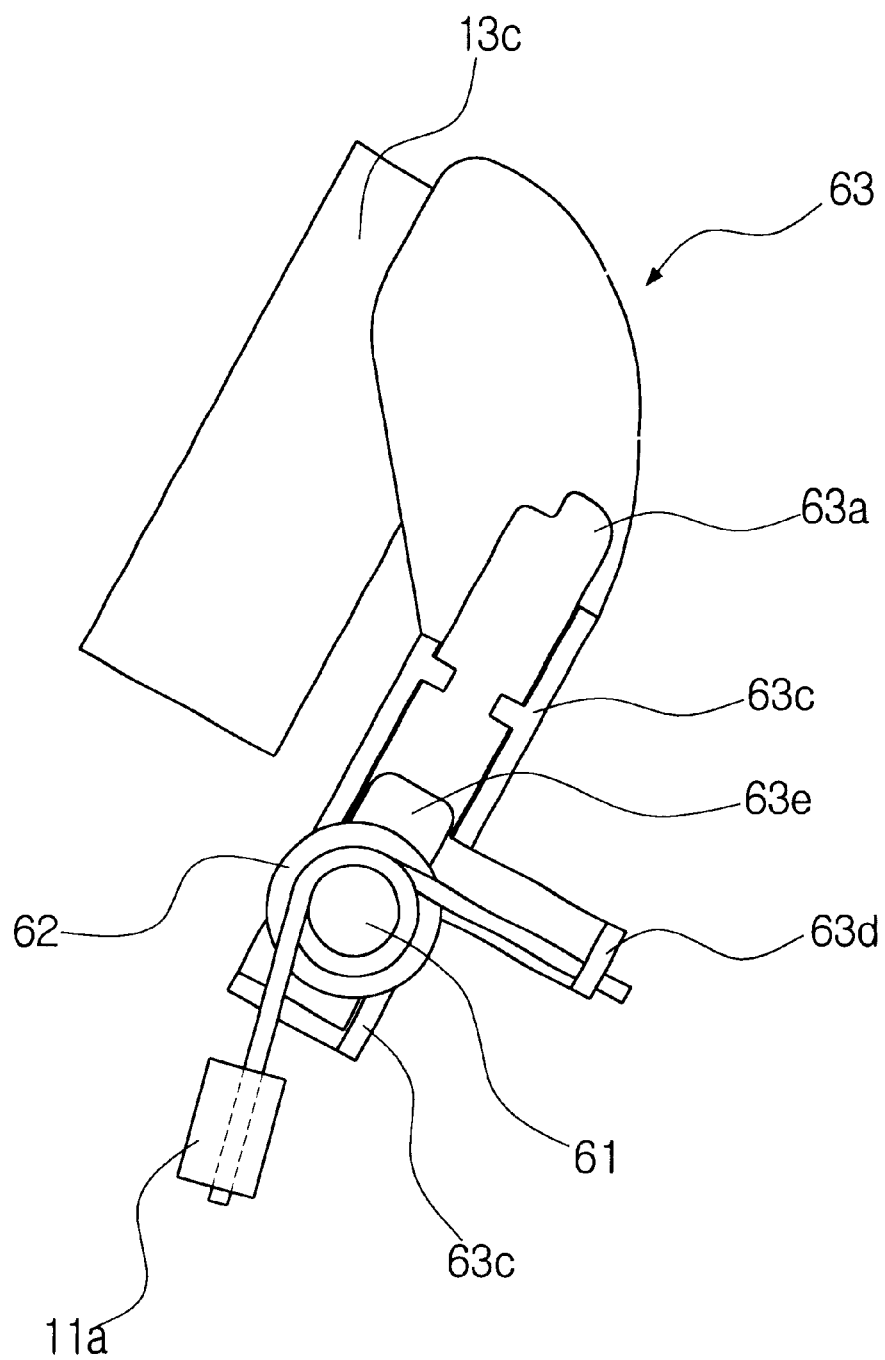
FIG. 4 is a detailed view of a press locking control device (6).

As shown in FIG. 4, a latching member (63a) having a corner cut out at the end and a slot opening at the center enabling to elastically slide upward or downward. Both side of the lower part of the pressing member (63) have the sliding guides (63c) to allow the latching member (63a) moving along the sliding guides (63c).

On the other hand, a torsion spring (62) is installed on the fixed shaft (61) to allow the pressing member (63) rotating. One end of torsion spring (62) is fixed by the protruded retainer (11a) of the first joint member (10) and the other end is fixed by the extended arm (63d) of the latching member (63a). Thus, the pressing member (63) enables to elastically rotate around the fixed shaft (61). At the same time, the latching member (63a) enables to slide upward or downward along the surface of the pressing member (63). Such a structure of the press locking control device (60) is controlled by engaging or disengaging to the detents disposed on the periphery of the second joint member (20).

More detailed description is presented as follows: As the second joint member (20) rotates, the lateral surface (28a) of the second joint member (20) is latched to the latching member (63a) of the pressing member (63). Herein, further rotation of the second joint member (20) pushes the latching member (63a). Then, the pressing member (63) formed integrally with the latching member (63a) is pushed together. As a result, because the pressing member (63) is disengaged from the upper surface of the locking block (33), the locking device (30) being restricted by the press locking control device (60) is released and able to move upward or downward.

Figure 5:
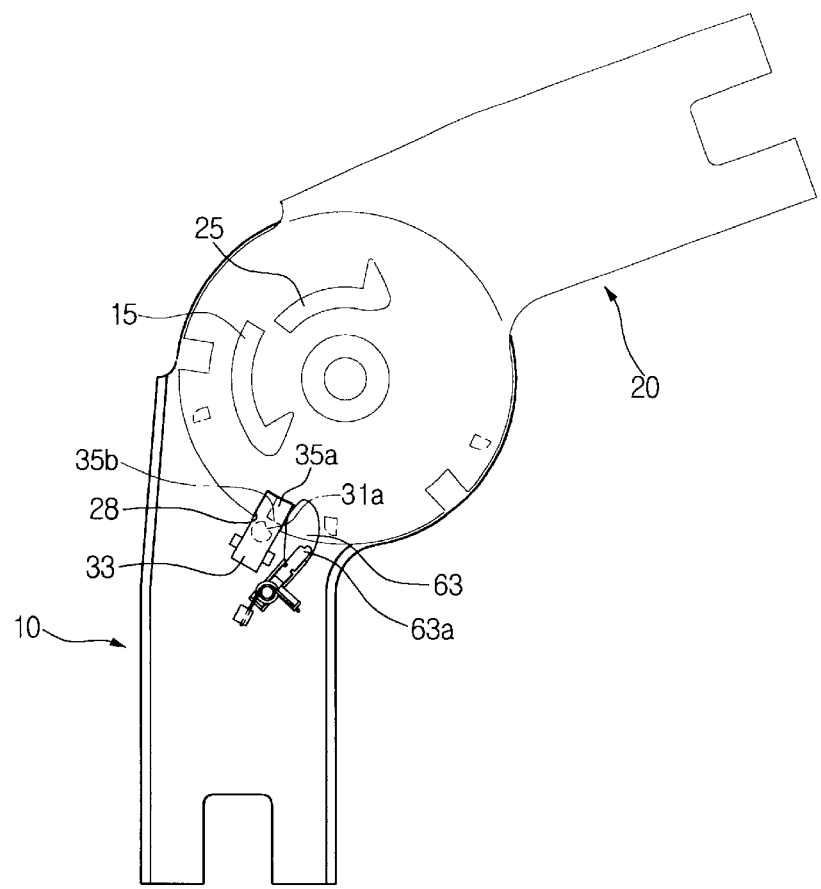
FIG. 5 is a plan view illustrating a locked state of the hinge so that a locking device latches a detent.
Figure 6:
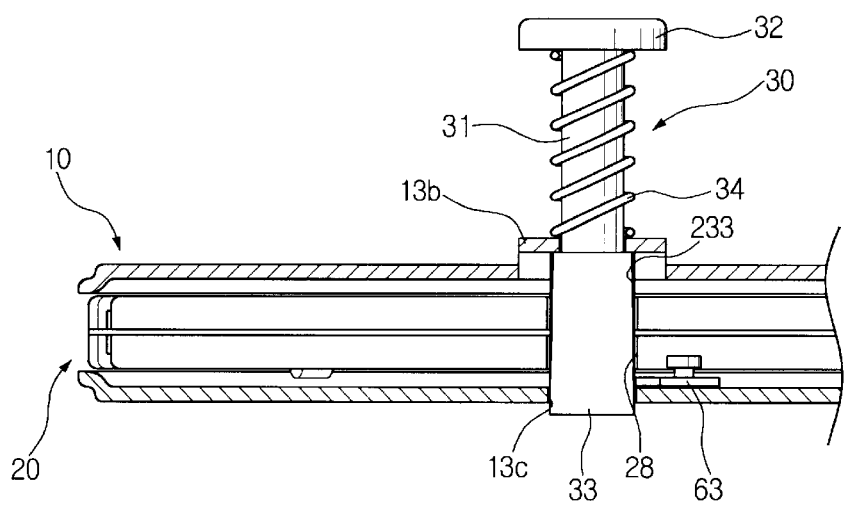
FIG. 6 is a section view illustrating a locked state of the hinge so that a locking device latches a detent.

As shown in FIG. 5 and FIG. 6, the first and second joint members (10, 20) are locked by engagement of the locking block (33) and the detent (28) of second joint member (20). The detent (28) has a same size and shape of the matching portion of the locking block (33) for smooth engagement. The locking block (33) goes through the detent (28) of the second joint member (20) by the resilient force of coil spring (34) until contacting the stopper (13b) being integrally formed with the main disc (13) of the first joint member (10). Thus, the first and second joint members (10, 20) are locked as the locking block (33) is blocked the detent (28) of the second joint member (20) through the slot openings (13a, 13c) of the first joint member (10).

As shown in FIG. 6, the rectangular locking block (33) is tapered from top to bottom so that the bottom of locking block (33) having larger surface than the top surface is tightly engaged into the slot opening (13c) of the first joint member (10) without a clearance. Thus, the ladder is securely latched without unstable movement or shaking.

When a user intends to open the ladder, he has to release the locking state for rotating the first and second joint members (10, 20). For releasing the locking condition, the user presses a button (32) to disengage the locking block (33) from the slot opening (13c) and detent (28).

Figure 7:
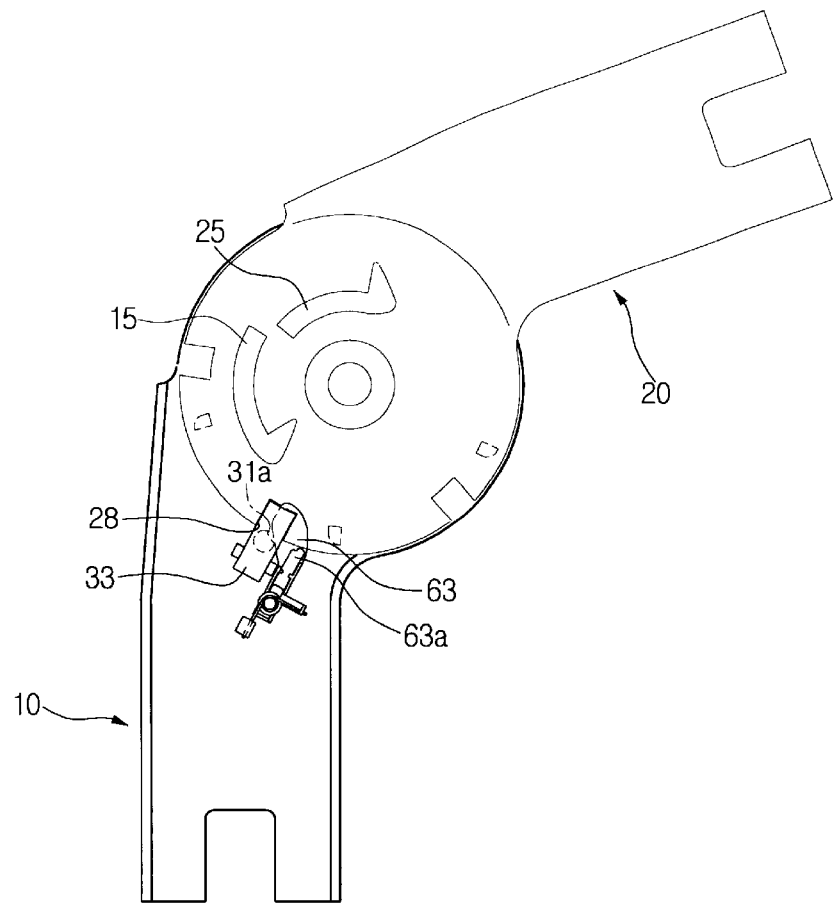
FIG. 7 is a plan view illustrating an unlocked state of the hinge so that the locking device is released a detent by pressing a button.
Figure 8:
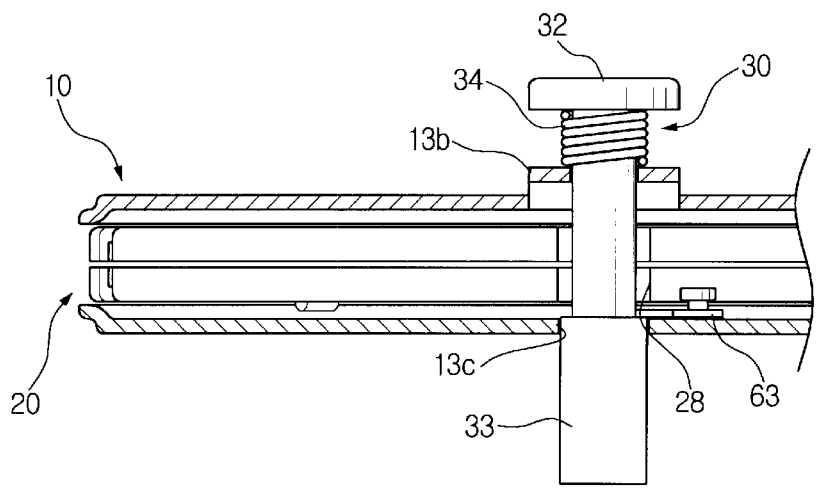
FIG. 8 is a section view illustrating an unlocked state of the hinge so that the locking device is released a detent by pressing a button.

FIG. 7 and FIG. 8 show an unlocking state of hinge so that the locking block (33) is disengaged from the detent (28) of the second joint member (20) by pressing the button (32). As the button (32) is pressed, the locking block (33) retrieves from the detent (28) passing through the slot opening (13c). When the locking block (33) is off from the detent (28), the pressing member (63) resiliently contacting on the lateral of the rectangular locking block (33) is restored back to sit on the first and second declined surfaces (35a, 35b) of the locking block (33) by the resilient force of torsion spring (62). Then, the pressing member (63) will block the stopper (31a) of the connecting pin (31) for restricting the rectangular locking block (33) and maintaining an unlocking state. As the locking state is released, the first and second joint members (10, 20) are able to freely rotate.

Figure 9:
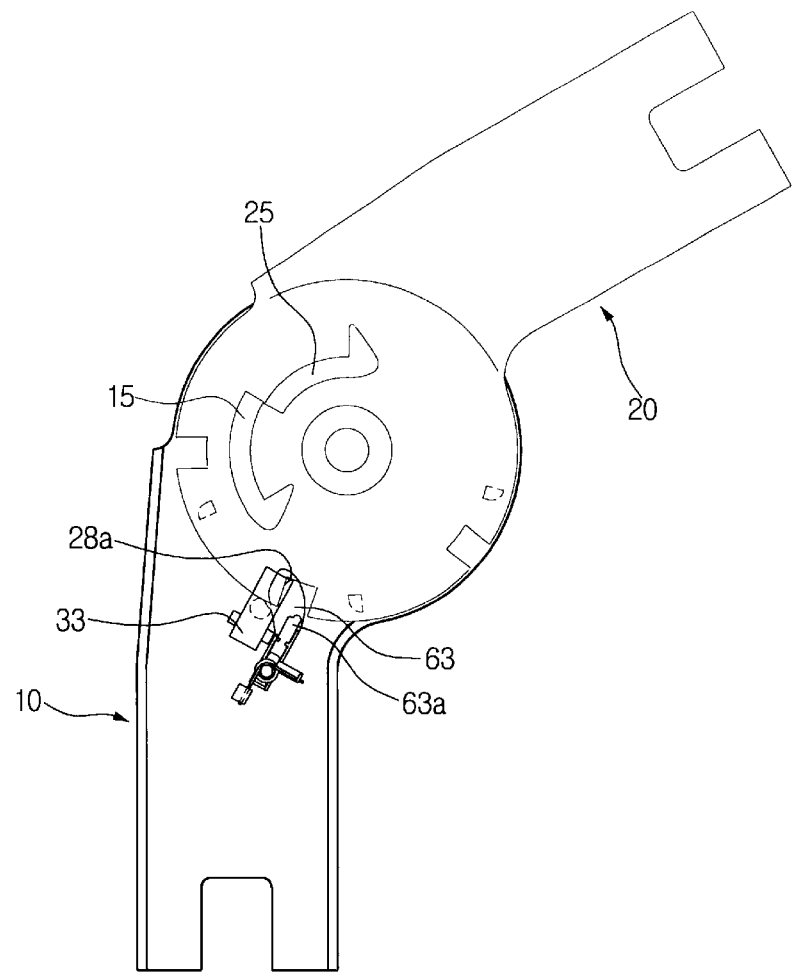
FIG. 9 is a plan view illustrating a state of the hinge prior to a locking device releasing a detent by a pressing device.
Figure 10:
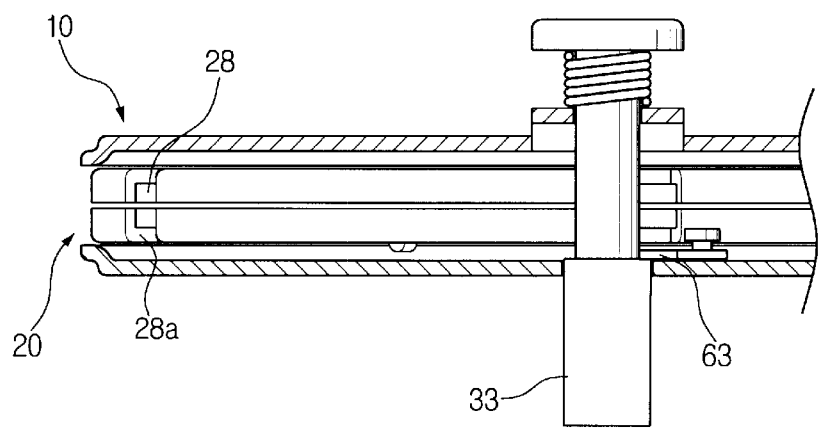
FIG. 10 is a section view illustrating a state of the hinge prior to a locking device releasing a detent by a pressing device.

When the first and second joint members (10, 20) are rotated, a lateral surface (28a) of the detent (28) of the second joint member (20) catches one end of latching member (63a) being installed on the pressing member (63) as shown in FIG. 9 and FIG. 10.

Figure 11:
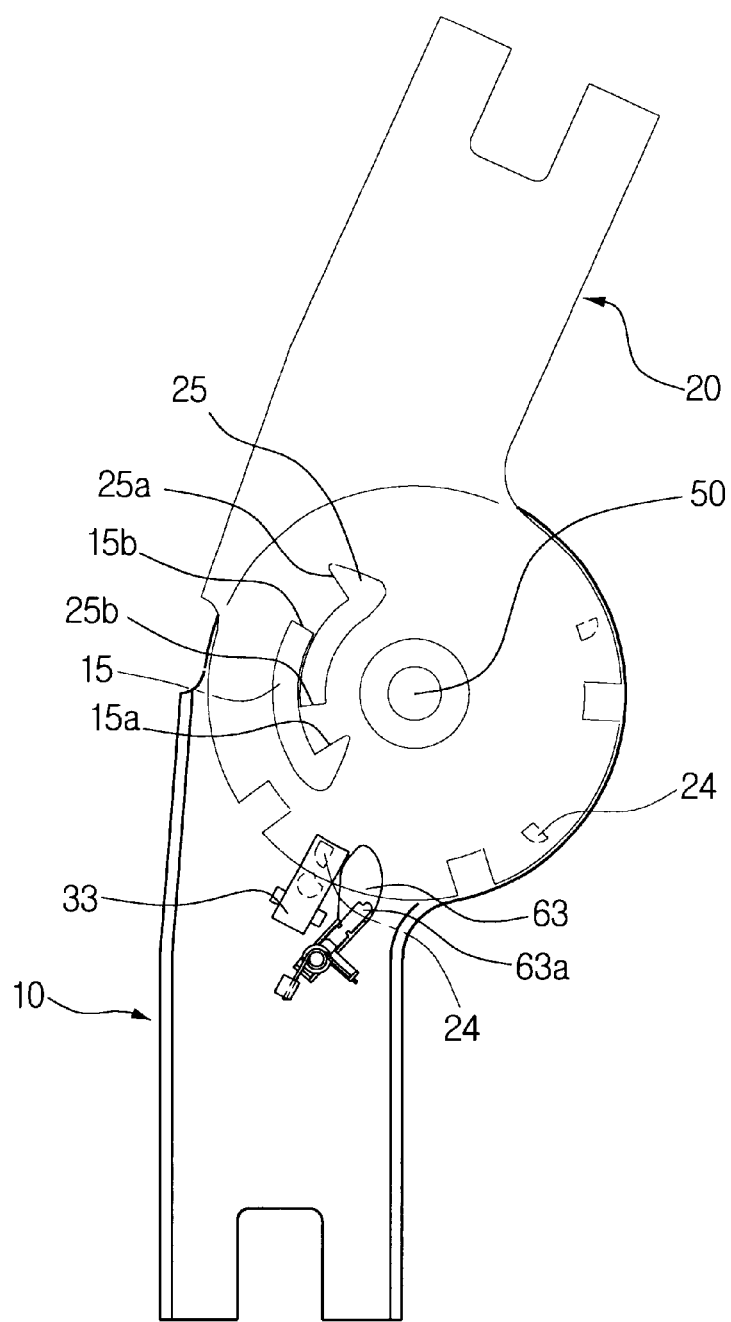
FIG. 11 is a plan view illustrating a state of the hinge so that a locking device is disengaged with a detent.
Figure 12:
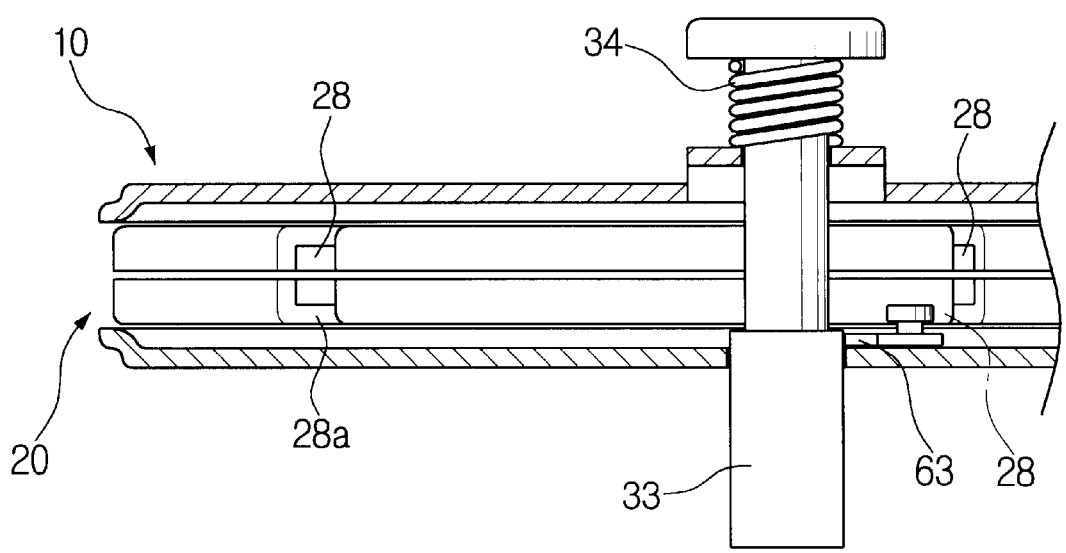
FIG. 12 is a section view illustrating a state of the hinge so that a locking device is disengaged with a detent.

If the first and second joint members (10, 20) are further rotated under the above conditions, the pressing member (63) as shown in FIG. 11 and FIG. 12 deviates from the upper part of the locking block (33) and elastically support the lateral of locking block (33). Then, the first and second joint members (10, 20) enable to easily rotate.

Due to the repeating operations of the ladder, the latching part (63a) of the pressing member (63) repeatedly latches and unlatches to the lateral surface (28a) of the detent (28). As a result, the lateral surface (28a) of the detent (28) will easily wear out. This causes a malfunction of the pressing member (63) that fails to latch or unlatch on the upper part of the locking block (33). For preventing a potential accident, a plurality of latching protrusions (24) being disposed near by the edge of periphery is provided on the surface of the sub disc (23) of the second joint member (20). If such an incident occurred that the latching member (63a) fails to latch on the lateral surface (28a) of the detent (28), a protrusion (24) will catch the latching member (63a) to carry out the same performance of the lateral surface (28a) of the detent (28).

Referring to FIG. 11 and FIG. 12, when the pressing member (63) deviates from the upper part of the locking block (33) and elastically supports the lateral of the locking block (33), the locking block (33) has a restoring tendency by the resilient force of the coil spring (34). However, the lower part of the second joint member (20) is maintained by the elastically supported condition.

Figure 13:
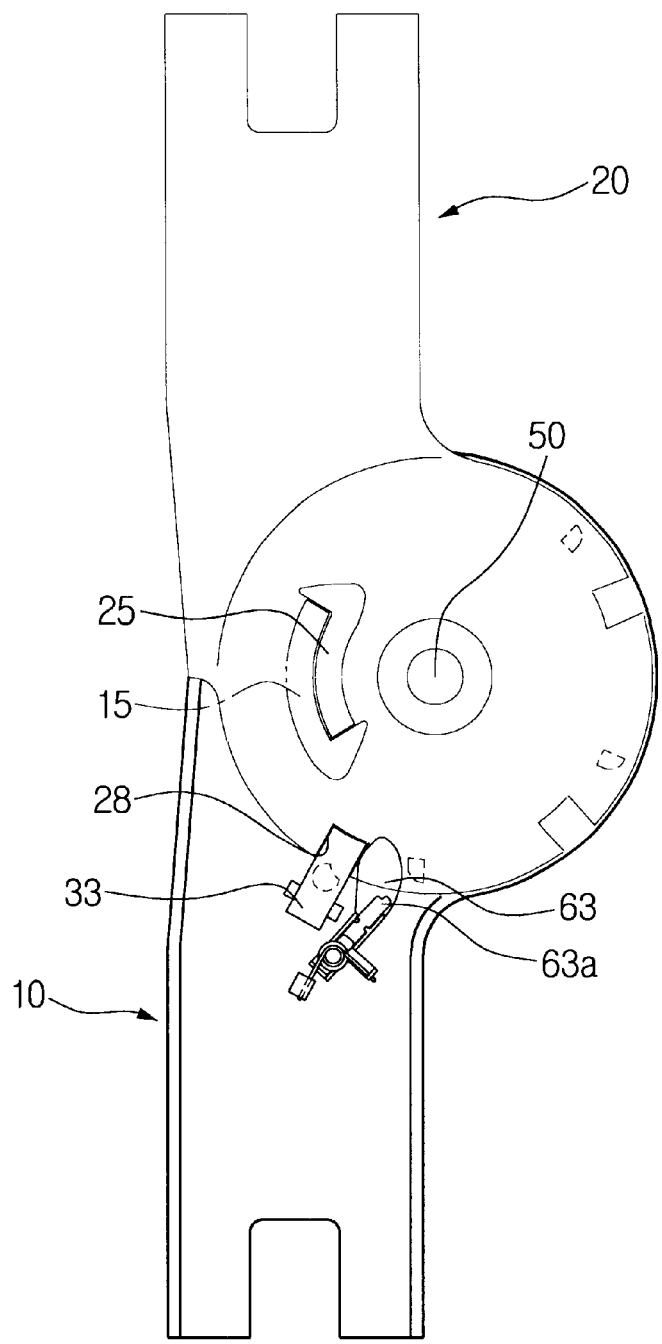
FIG. 13 is a plan view illustrating a state of the hinge so that the joint members are unfolded to 180°.
Figure 14:
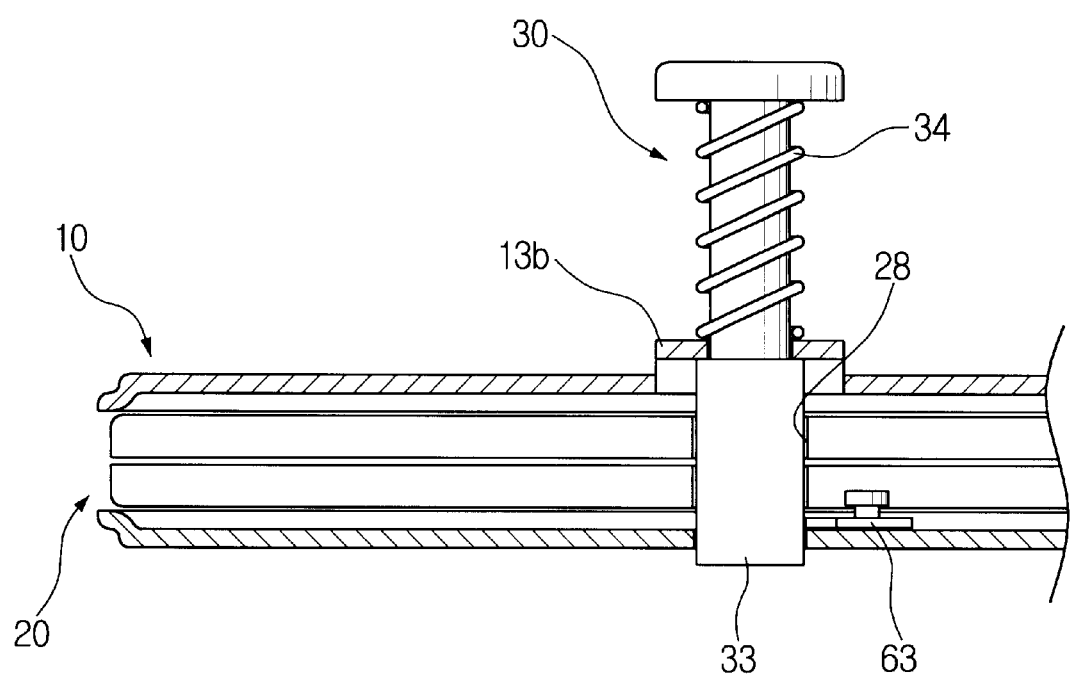
FIG. 14 is a section view illustrating a state of the hinge so that the joint members are unfolded to 180°.

As shown in FIG. 13 and FIG. 14, when the second joint member (20) rotates further to lineup with the first joint member (20), the locking block (33) is latched with the detent (28) of the second joint member (20) located at end. Then, the locking block (33) moved upward by the resilient force of the coil spring (34) for blocking cross the detent (26) and stopping at the stopper (13b) formed with the first joint member (10) same as shown in FIG. 5 and FIG. 6. Thus, the first and second joint members (10, 20) are locked not to allow rotate each other.

In FIG. 13, a pair of arcuate protrusions (15, 25) for the anti-swing is provided on the opposite surface of the discs (14, 23) of the first and second joint members (10, 20). The arcuate protrusions (15, 25) are formed to face and match each other. When the first and second joint members (10, 20) are unfolded to 180°, the arcuate protrusions (15, 25) are matched each other to restrict the rotation of both members. It is designed to prevent overlapping of the ladders causing from the sudden impact or moment of inertia due to the over length and weight. The arcuate protrusions (15, 25) are formed at the inner surface of the main disc (14) of the first joint member (10) and outer surface of the sub disc (23) of the second joint member (20).

Herein, more detailed descriptions related to the arcuate protrusions (15, 25) are presented by referring to FIG. 11. Each of the arcuate protrusions (15, 25) comprises a bent up end (15a, 25a) at one end, a stopper having flat end surface (15b, 25b) at the opposite end and a contacting surface having the coaxial arc curvature. Both of the arcuate protrusions (15, 25) are matched each other throughout the contacting surfaces without interfering until the first and second joint members (10, 20) are lining up to 180°. The bent up ends (15a, 25a) are disposed at the opposite end with the opposite directions each other. Other ends of the arcuate protrusions (15, 25) forming the stoppers (15b, 25b) disposed at the opposite location to contact with the bent up ends (15a, 25a). Both ends of the bent up ends (15a, 25a) and stoppers (15b, 25b) of arcuate protrusions (15, 25) will contact each other at the same time for limiting the rotation of first and second joint members (10, 20).

On the other hand, the clearance (or tolerance) between the contacting parts of the first and second joint members (10, 20) such as between the arcuate protrusions (15, 25), discs (13, 14, 23), center shaft (50) and locking block (33) must be consistently maintained for maximizing the supporting capability and smooth operating of the ladder without the unstable movements or shaking. Through the experiments, the optimum clearance is 0.6 mm or less for evenly distributing the load to each part.

The experiment reveals that the prior art of the folding ladders without the press locking control device (60) has ruptured the guiding discs or springs at 7,000 repeating tests of folding and unfolding. But, the present invention being equipped with the press locking control device (60) reveals that there are no ruptured parts through more than 8,000 consecutive repeating tests of folding and unfolding.

Figure 15:
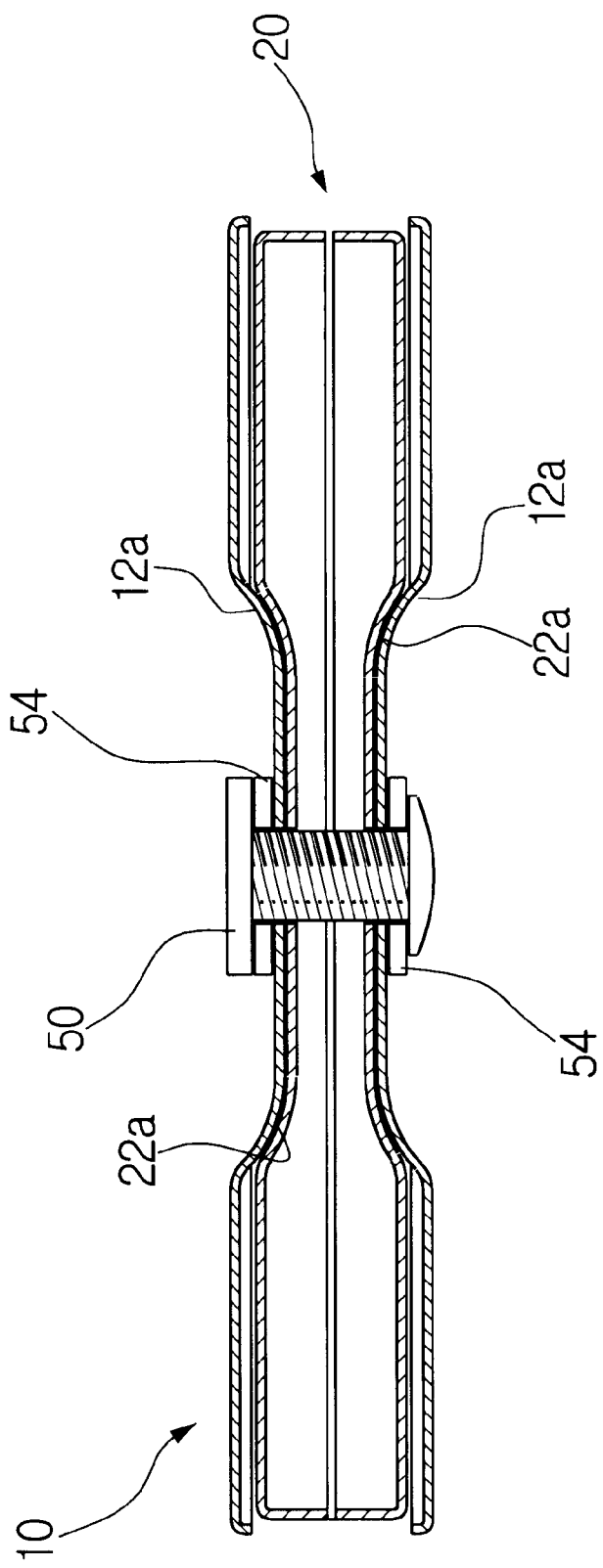
FIG. 15 is a section view illustrating a structure of the central axis of the hinge being applied to the different structure.

FIG. 15 shows another structure type of the present invention being adopted a revet shaped center shaft (50) and washers (54). The connecting part of the first and second joint members (10, 20) with the center shaft (50) forms a concaved portion (12a, 22a) being thinner than the ladder body. When the hinge of ladders receives an external impact, the load is transmitted directly to the center shaft (50) and the interior parts. This may causes the rupturing the center shaft (50) and the interior parts. In order to prevent the potential malfunction due to the deformation or damages of the interior parts, the concaved portion (12*a*, 22*a*) is designed for absorbing the external impact. Thus, this structure guarantees the safety operation of the ladders.

Figure 16:
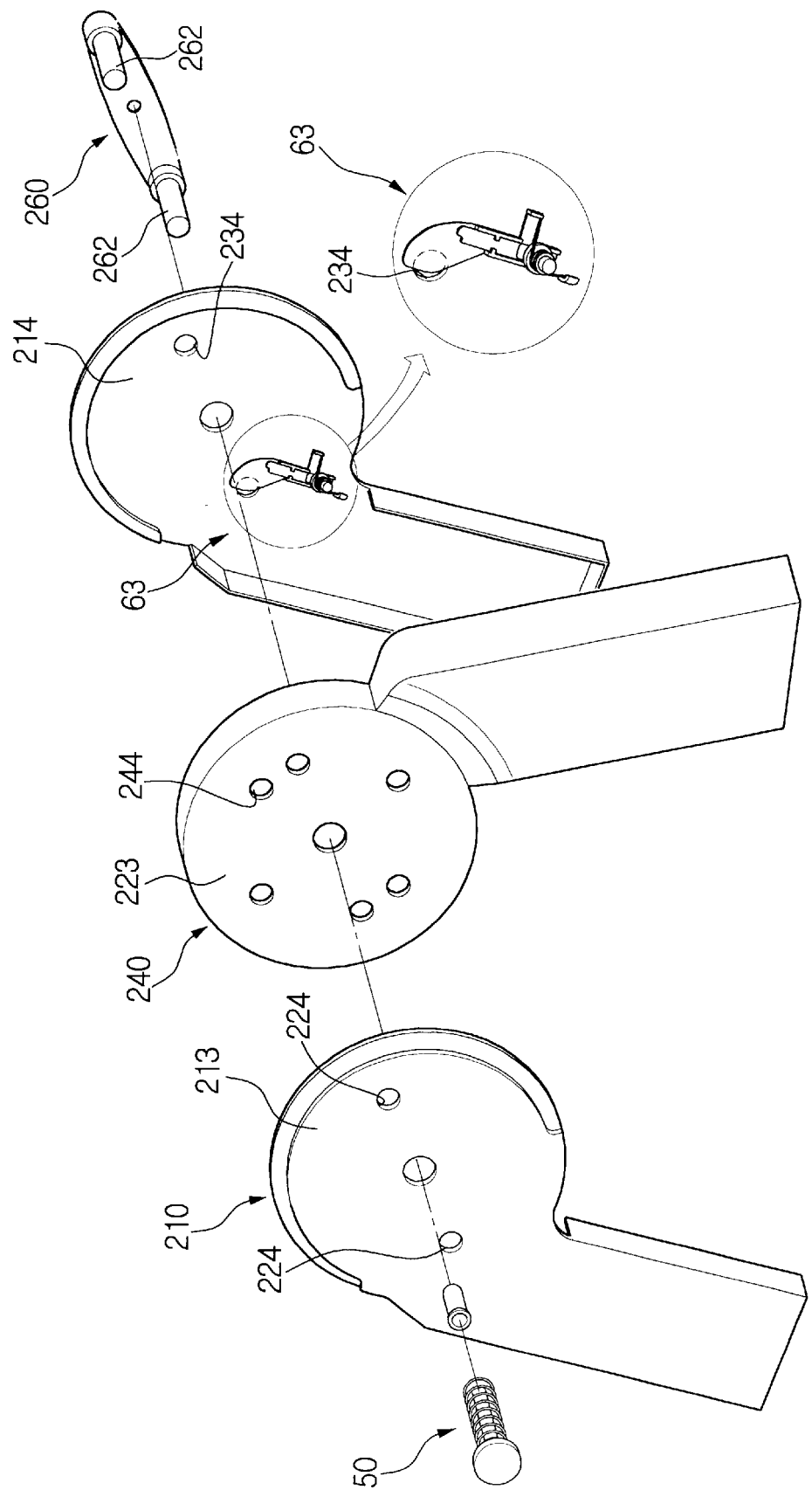
FIG. 16 is an exploded drawing of a press locking control device being applied to an alternative embodiment of the present invention.

FIG. 16 shows an alternative embodiment of the present invention. In this implementing example, the same structure of the pressing member (63) is adapted along with the conventional locking device. The locking device (260) as shown in the implementing example adapts a pair of the protruding pins (262). A pair of main discs (213, 214) of the first joint member (210) has two common holes (224, 234) for piercing through the protruding pins (262) of the locking device (260). A sub disc (223) of the second joint member (240) being inserted between the main discs (213, 214) has six piercing holes (244). The center shaft (50) and locking device (260) having the protruding pins (262) are mounted as a unit for controlling the operation of the ladders. This alternative locking device operates the same way as the locking device (30) with press locking control device (60).

Thus, the new concept of hinge structures of the present invention is maximizing the supporting capability with the smooth operation of the ladder without the unstable movements or shaking.

While the present invention has been described in detail with its preferred embodiments, it will be understood that it further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. A hinge for foldable ladders comprises a first joint member (10) integrally formed with a pair of main discs (13, 14), a second joint member (20) integrally formed with a sub disc (23) being engaged between the pair of main disc (13, 14), a center shaft (50) for combining the first and second joint members, a locking device (30), the hinge comprises:

a locking device (30) having a button (32), a connecting pin (31), a coil spring (34) and a rectangular locking block (33), a press locking control device (60) for controlling latching or unlatching said locking device (30), a pair of slot openings (13*a*, 13*c*) formed at said first joint member (10) for engaging said locking block (23), a first protruded arcuate stopper (15) disposed at inner surface of said main disc (14) of said first joint member (10), a second protruded arcuate stopper (25) disposed at rear surface of said sub disc (23) of said second joint member (20) for matching said first protruded arcuate stopper (15), a plurality of latching protrusions (24) being disposed near by peripheral edge, and a pressing member (63) being attached to a fixed shaft (61) for exerting resilient force on said rectangular locking block (33) and disposed on a slot opening (13*c*) of the first joint member (10).

2. A hinge for foldable ladders as claimed of claim 1, said press locking control device (60) further comprises a fixed shaft (61), a torsion spring (62) being installed at said fixed shaft (61), a pressing member (63) for exerting a resilient force on said rectangular locking block (33), and a latching member (63*a*) enabling to slide upward or downward on said pressing member (63).

3. A hinge for foldable ladders as claimed of claim 1 further comprises a declined surface (35) formed in two-dimensional directions at upper surface of said rectangular locking block (33), a stopper (31*a*) disposed at an end of said connecting pin (31) and said pressing member (63) being elastically seated on said declined surface (35) and contacted to stop at said stopper (31*a*).

4. A hinge for foldable ladders as claimed of claim 1 further comprises said locking block (33) being tapered (233) from top to bottom having larger bottom surface than top surface for tight engagement.

5. A hinge for foldable ladders as claimed of claim 1 further comprises a connecting part for combining main discs (13, 14) of the first joint member and the sub disc (23) of the second joint member formed a concaved portion (12*a*, 22*a*) being thinner than a ladder body.

6. A hinge for foldable ladders as claimed of claim 1 further comprises a clearance between said first and second joint members (10, 20), arcuate protrusions (15, 25), main discs (13, 14), sub disc (23), center shaft (50) and locking block (33) is less than 0.6 mm.

\* \* \* \* \*